(12) United States Patent
Park (10) Patent No.: US 8,170,568 B2
(45) Date of Patent: May 1, 2012

(54) APPARATUS AND METHOD OF SETTING MULTI-CHANNELS IN NETWORK SYSTEM

(75) Inventor: Byung-Jun Park, Suwon-si (KR)

(73) Assignee: Samsung Electronics co., Ltd., Suwon-si (KR)

( * ) Notice: Subject to any disclaimer, the term of this patent is extended or adjusted under 35 U.S.C. 154(b) by 503 days.

(21) Appl. No.: 12/322,585

(22) Filed: Feb. 4, 2009

(65) Prior Publication Data

US 2009/0197609 A1 Aug. 6, 2009

(30) Foreign Application Priority Data

Feb. 4, 2008 (KR) ......................... 10-2008-0011141

(51) Int. Cl.
*H04W 72/00* (2009.01)

(52) U.S. Cl. ..................................... 455/450; 455/452.1
(58) Field of Classification Search .................. 455/450, 455/452.1
See application file for complete search history.

(56) References Cited

U.S. PATENT DOCUMENTS

| 2007/0183320 | A1* | 8/2007 | Chen et al. | 370/229 |
| 2007/0206545 | A1* | 9/2007 | Lee et al. | 370/338 |
| 2008/0025280 | A1* | 1/2008 | Hsu et al. | 370/341 |
| 2008/0310448 | A1* | 12/2008 | Hanov et al. | 370/470 |
| 2009/0109932 | A1* | 4/2009 | Maheshwari et al. | 370/335 |
| 2010/0130248 | A1* | 5/2010 | Schmidt | 455/553.1 |

OTHER PUBLICATIONS

"Part 16: Air Interface for Fixed and Mobile Broadband Wireless Access Systems, Amendment 2: Physical and Medium Access Control Layers for Combined Fixed and Mobile Operation in Licensed Bands and Corrigendum 1", IEEE Std 802.16e, Feb. 28, 2006, 864 pages.

* cited by examiner

*Primary Examiner* — Barry Taylor (57) ABSTRACT

An apparatus of setting multi-channels in a network system includes a mobile station transmitting at least one piece of channel information on a request message, wherein the request message requests to set a connection identifier for a communication service; and a control station calculating a bandwidth according to number of channels using the request message received from the mobile station and setting the calculated bandwidth as a service bandwidth of the connection identifier. The control station such as an ACR supports multi-channels through one frame structure (i.e., a communication structure of a connection identifier) and thus radio resources (e.g., bandwidth) to be provided to the mobile station are reduced.

16 Claims, 6 Drawing Sheets

| Type | Parameter |
|---|---|
| 1 | Service Flow Identifier |
| 2 | CID |
| 3 | Service Class Name |
| 4 | reserved |
| 5 | QoS Parameter Set Type |
| 6 | Traffic Priority |
| 7 | Maximum Sustained Traffic Rate |
| 8 | Maximum Traffic Burst |
| 9 | Maximum Reserved Traffic Rate |
| 10 | Maximum Tolerable Traffic Rate |
| 11 | Service Flow Scheduling Type |
| 12 | Request Transmission Policy |
| 13 | Tolerated Jitter |
| 14 | Maximum Latency |
| 15 | Fixed-length versus Variable-length SDU Indicator |
| 16 | SDU Size |
| 17 | Target SAID |
| 18 | ARQ Enable |
| 19 | ARQ_WINDOW_SIZE |
| 20 | ARQ_RETRY_TIMEOUT-Transmitter Delay |
| 21 | ARQ_RETRY_TIMEOUT-Receiver Delay |
| 22 | ARQ_BLOCK_LIFETIME |
| 23 | ARQ_SYNC_LOSS |
| 24 | ARQ_DELIVER_IN_ORDER |
| 25 | ARQ_PURGE_TIMEOUT |
| 26 | ARQ_BLOCK_SIZE |
| 27 | reserved |
| 28 | CS Specification |
| 143 | Vendor-specific QoS Parameter |
| 99-107 | Convergence Sublayer Types |

FIG.3B

| Type | Parameter |
|------|-----------|
| : | : |
| 47 | Number of Multi-Channels |
| 48 | Channel Identifier |
| 49 | Number of Frame Sizes |
| : | : |

FIG.5

APPARATUS AND METHOD OF SETTING MULTI-CHANNELS IN NETWORK SYSTEM

CROSS-REFERENCE TO RELATED APPLICATION(S) AND CLAIM OF PRIORITY

The present application claims the benefit under 35 U.S.C. §119 (a) of a Korean patent application filed in the Korean Intellectual Property Office on Feb. 4, 2008, and there duly assigned Serial No. 10-2008-0011141, the entire disclosure of which is hereby incorporated by reference.

TECHNICAL FIELD OF THE INVENTION

The present invention relates to an apparatus and method of setting multi-channels in a wireless network system.

BACKGROUND OF THE INVENTION

As is known in the art, Worldwide Interoperability for Microwave Access (WiMax) uses Unsolicited Grant Service (UGS) in order to ensure the Quality of Service (QoS) of a Voice over Internet Protocol (VoIP) call. In WiMax, predetermined bandwidth resources are assigned through UGS.

For the purpose of UGS associated services, a mobile station such as an Integrated Access Device (IAD) is assigned an initial radio resource through a net entry process. The net entry process is designed to set bandwidths for UGS associated services by performing DSA_REQ/DSA_RSP procedures.

In the net entry process realized up to present, one UGS service is connected by one DSA_REQ/DSA_RSP procedure. When the mobile station attempts to use three channels, the DSA_REQ/DSA_RSP procedure has to be performed three times for forward and backward directions.

In the case of VoIP environment, a voice codec, which is initially negotiated with a counterpart station, can be frequently replaced by another voice codec. When a G.711 voice codec using a bandwidth 80 Kbps set to a channel is replaced with a G.729 voice codec using a bandwidth 24 Kbps, the remaining 56 Kbps bandwidth is not used and thus is wasted.

For example, the IAD, to which a plurality of channels (i.e., n number of channels) are assigned, suffers from the waste of radio resources since a bandwidth of n×56 Kbps is not used.

Conversely, when a G.729 voice codec using a 24 Kbps bandwidth set to a channel is replaced with a G.711 voice codec using a 80 Kbps bandwidth, QoS cannot be ensured due to a narrow transmission/reception bandwidth.

SUMMARY OF THE INVENTION

To address the above-discussed deficiencies of the prior art, it is a primary aspect of the present invention to provide an apparatus and method of supporting a multi-channel communication service through one connection identifier.

Another aspect of the invention is to provide an apparatus and method of setting multi-channels in a wireless network system, in which a control station such as Access Control Router (ACR) calculates and sets a service bandwidth for one connection identifier according to a number of channels of mobile stations.

According to an aspect of the invention, the apparatus of setting multi-channels in a network system includes a mobile station transmitting at least one piece of channel information on a request message, wherein the request message requests to set a connection identifier for a communication service; and a control station calculating a bandwidth according to a number of channels using the request message received from the mobile station and setting the calculated bandwidth as a service bandwidth of the connection identifier.

In an exemplary embodiment of the invention, the channel information may include at least one selected from the group consisting of a number of channels to be used by the mobile station, an identification information of the channels and a minimum frame size of the mobile station.

In another exemplary embodiment of the invention, the control station may include a memory storing calculation information, based on which the bandwidth according to the number of channels is calculated; and a controller setting, when the request message requesting to set a connection identifier is received, the bandwidth calculated based on the calculation information in the memory as the service bandwidth of the connection identifier.

In a further exemplary embodiment of the invention, the controller may include an extractor extracting the number of channels to be used by the mobile station from the request message received from the mobile station; a calculator calculating the bandwidth of the number of channels extracted by the extractor based on the calculation information in the memory; and a setter setting the bandwidth calculated by the calculator as the service bandwidth of the connection identifier.

In further another exemplary embodiment of the invention, the calculation information may include at least one predetermined number of channels and a service bandwidth according to the predetermined number of channels.

In another exemplary embodiment of the invention, the calculation information may include a reference number of channels and a reference bandwidth.

In a further exemplary embodiment of the invention, the reference bandwidth may include the minimum frame size included in the channel information.

In yet another exemplary embodiment of the invention, the calculator may calculate the bandwidth by expanding the reference bandwidth according to a degree by which the extracted number of channels exceeds the reference number of channels.

According to an aspect of the invention, the method of setting multi-channels in a network system includes transmitting, at a mobile station, at least one piece of channel information on a request message, wherein the request message requests to set a connection identifier; and storing, at a control station, calculation information, based on which a bandwidth according to a number of channels is calculated, calculating a bandwidth according to a number of channels included in the request message received from the mobile station, and setting the calculated bandwidth as a service bandwidth of the connection identifier.

In an exemplary embodiment of the invention, the channel information may include at least one selected from the group consisting of a number of channels to be used by the mobile station, an identification information of the channels and a minimum frame size of the mobile station.

In another exemplary embodiment of the invention, the procedure of setting the calculated bandwidth as a service bandwidth of the connection identifier may include extracting the number of channels to be used by the mobile station from the request message received therefrom; calculating the bandwidth according to the extracted number of channels based on the stored calculation information; and setting the calculated bandwidth as the service bandwidth of the connection identifier.

In a further exemplary embodiment of the invention, the bandwidth according to the extracted number of channels may be calculated by reading the service bandwidth corresponding to the extracted number of channels using the calculation information, which includes at least one predetermined number of channels and a service bandwidth according to the predetermined number of channels.

In further another exemplary embodiment of the invention, the bandwidth according to the extracted number of channels be calculated using the calculation information, which includes a reference number of channels and a reference bandwidth, by expanding a reference bandwidth according to a degree, by which the number of channels exceeds the reference number of channels.

In yet another exemplary embodiment of the invention, the reference bandwidth may include the minimum frame size included in the channel information.

According to the exemplary embodiments of the invention as set forth above, a mobile station performs a single setting procedure to allow using Unsolicited Grant Service (UGS) multi-channels, which would otherwise have to be repeated by the number channels in a conventional network system.

Furthermore, a control station such as an ACR can support multi-channels through one frame structure (i.e., a communication structure of a connection identifier) even if connection identifiers are not assigned to respective channels to be provided to a mobile station. As an advantageous effect, radio resources (e.g., bandwidth) to be provided to the mobile station are reduced.

Moreover, the QoS of communication services can be ensured since a corresponding bandwidth may not be limited even if a codec in a corresponding channel is replaced with a codec having a greater bandwidth.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Figure 1:
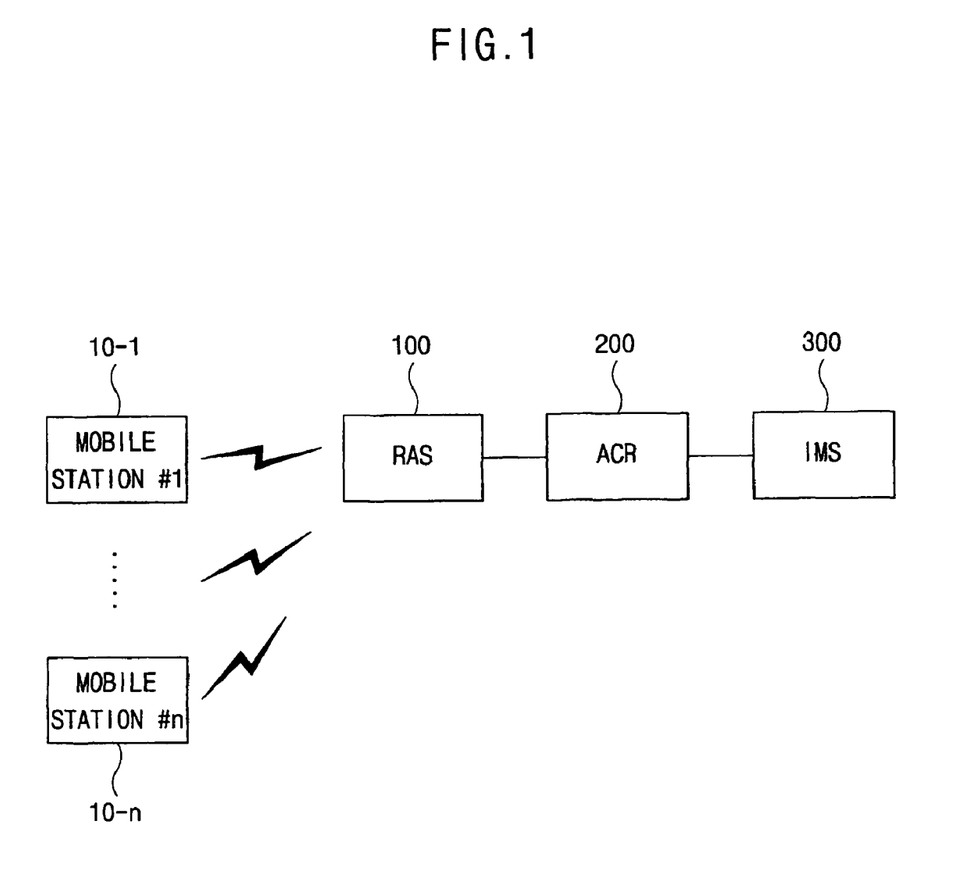
FIG. 1 is a schematic block diagram illustrating the construction of a network system according to an exemplary embodiment of the invention.
Figure 2:
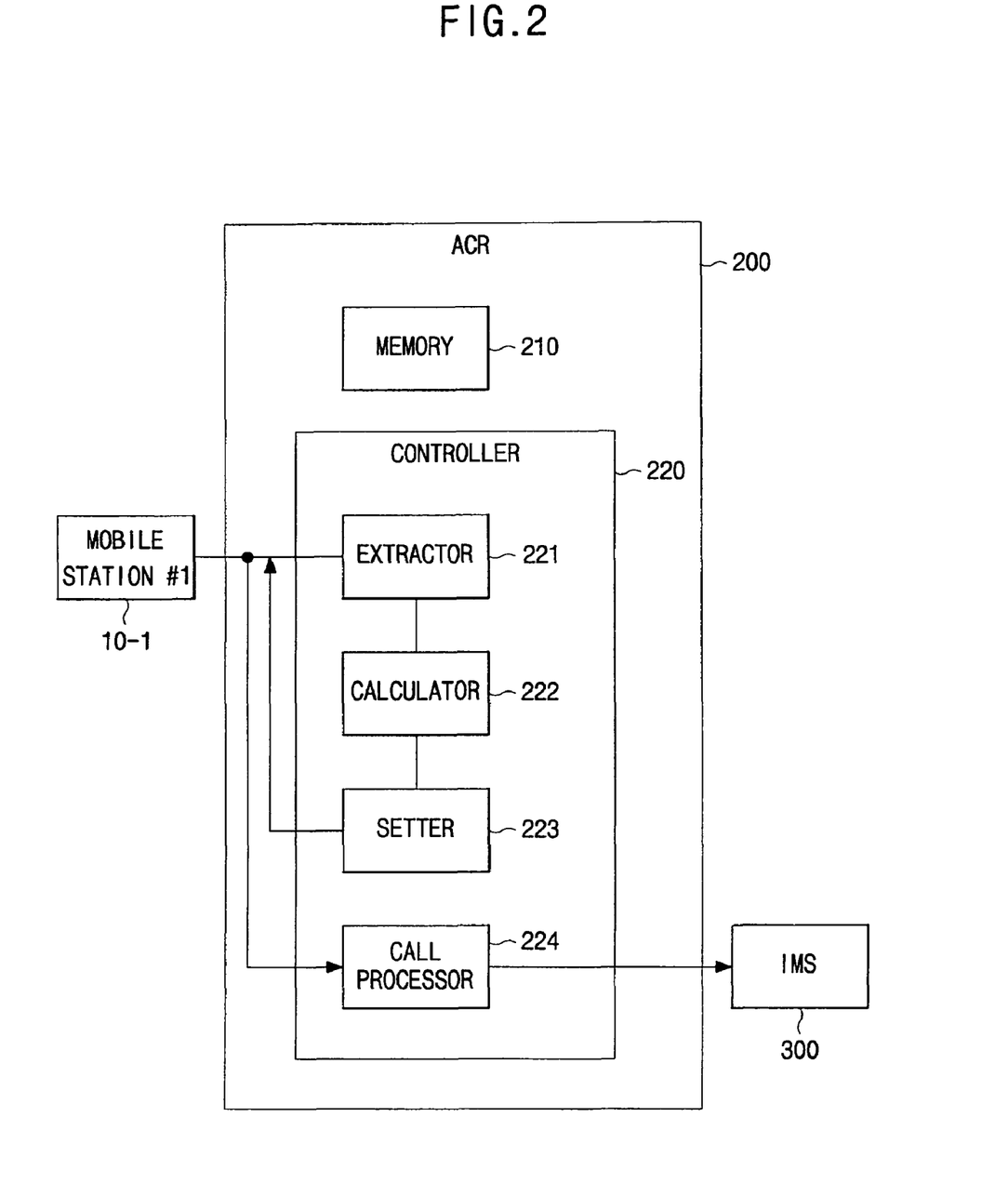
FIG. 2 is a block diagram illustrating the construction of the Access Control Router (ACR) shown in FIG. 1.

FIG. 1 is a schematic block diagram illustrating a construction of a network system according to an exemplary embodiment of the invention, and FIG. 2 is a block diagram illustrating a construction of the control station shown in FIG. 1.

Referring to FIG. 1, the network system includes a plurality of mobile stations 10-1 to 10-n supporting multi-channels to perform call processing, a Radio Access Station (RAS) 100 providing a wireless communication range in a cell area and an Access Control Router (ACR) 200 (or an access control station) providing wireless resources for a communication service through the RAS 100. The network system is connected to another network system such as an IP Multimedia Subsystem (IMS) 300.

Each of the mobile stations 10-1 to 10-n transmits a request message to the ACR 200 to request a Connection Identifier (CID) for supporting multiple Unsolicited Grant Service (UGS) channels according to an embodiment of the invention.

The request message includes channel information to be used by the mobile stations 10-1 to 10-n, and can be composed by service low management encoding, which is supported by the 802.16 standard.

Figure 3A:
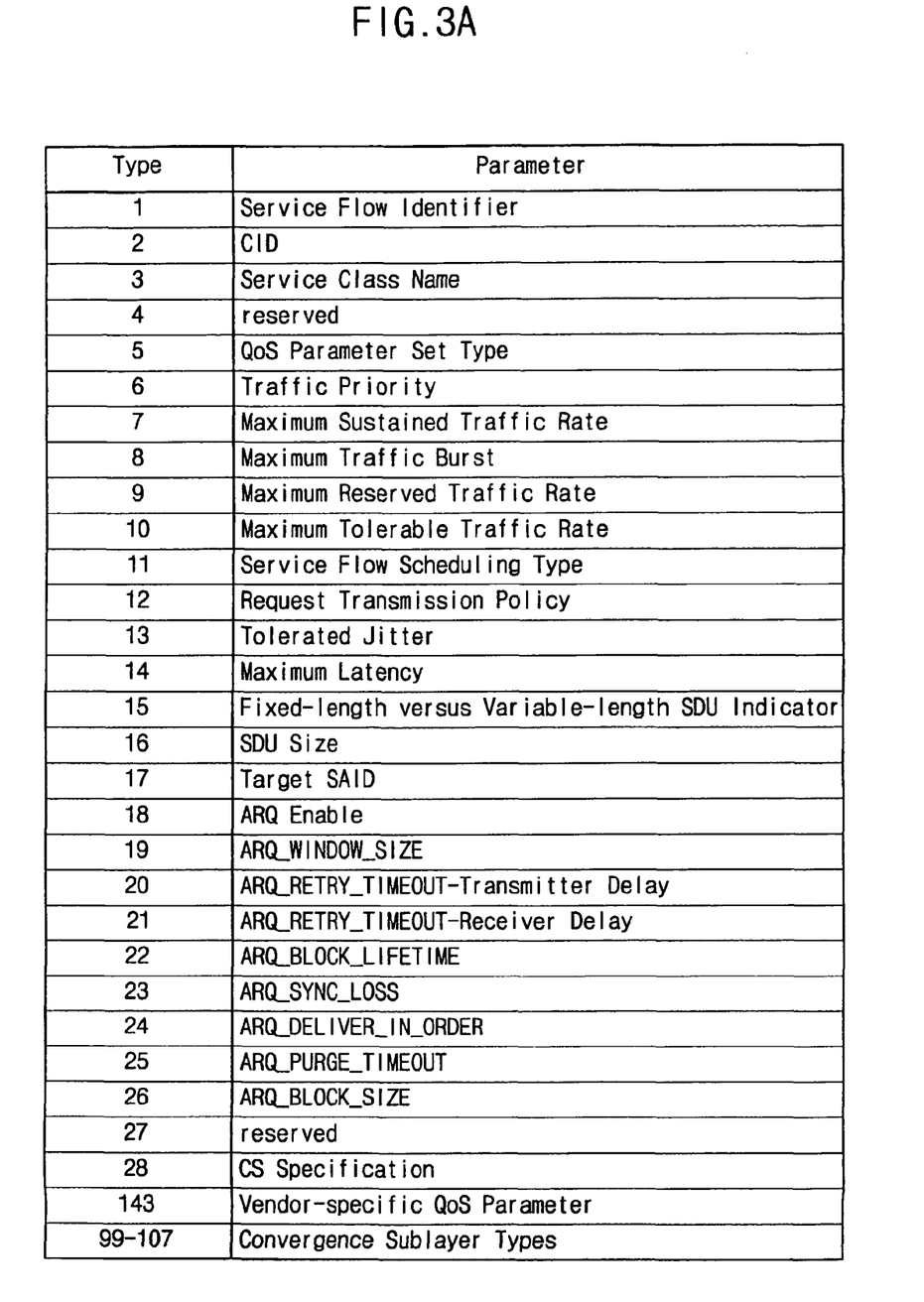
FIGS. 3A and 3B are representations illustrating information types of a request message used in a network system according to an exemplary embodiment of the invention.
Figure 3B:
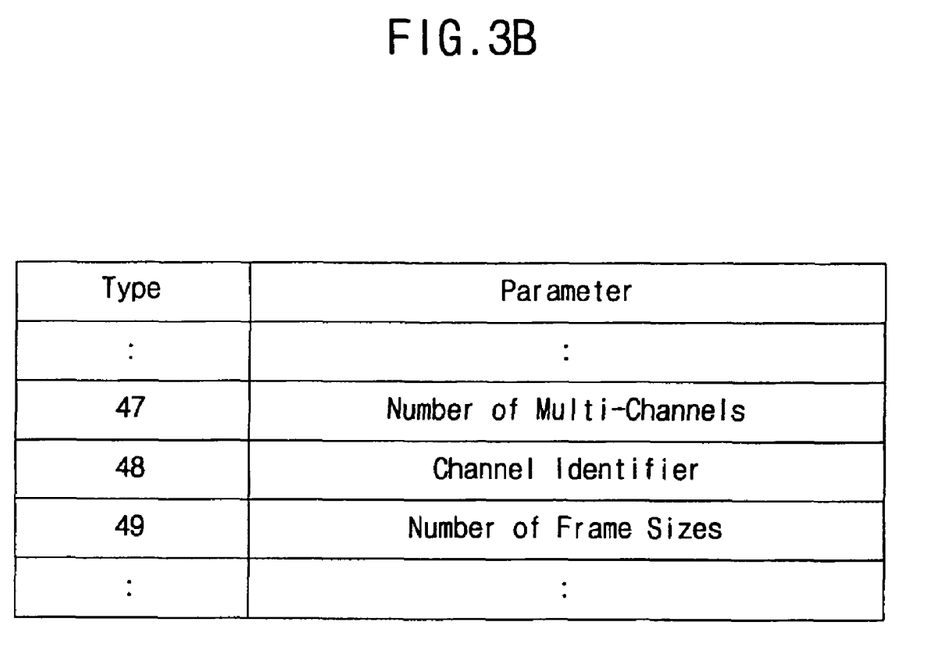

The request message can be composed according to information types as shown in FIGS. 3A and 3B.

FIG. 3A is an information type (including a connection identifier CID) provided by a conventional request message, and FIG. 3B is an information type to which channel information according to an embodiment of the invention is added.

The channel information includes the number of multi-channels, a channel identifier and a minimum frame size (i.e., the number of frame sizes) to be used by the mobile station 10-1, such that multi-channels can be set by one CID according to an exemplary embodiment of the invention. However, the present invention is not limited to type numbers or parameter names, which are specifically illustrated.

The ACR 200 performs a process of setting one CID according to an exemplary embodiment of the invention using a received request message.

For this, as shown in FIG. 2, the ACR 200 includes a memory 210 storing calculation information, based on which a bandwidth according to the number of channels is calculated, and a controller 220 calculating the bandwidth according to the number of channels as a service bandwidth of one CID.

Here, the calculation information includes an arbitrary reference number of channels and an arbitrary reference bandwidth according to an embodiment of the invention.

The controller 220 includes an extractor 221 extracting the number of channels from a request message, a calculator 222 calculating a bandwidth and a setter 223 setting the calculated bandwidth as a service bandwidth of a corresponding CID.

Based on the request message from, for example, the mobile station 10-1, the extractor 221 extracts the number of multi-channels and the minimum frame size to be used by the mobile station 10-1.

The calculator 222 calculates the bandwidth according to the number of multi-channels extracted by the extractor 221 using the calculation information stored in the memory 210.

In more detail, the calculator 222 calculates the bandwidth using the channel information including a reference number of channels and a reference bandwidth, particularly, by expanding the reference bandwidth according to the degree by which the number of channels to be used by the mobile station 10-1 exceeds the reference number of channels.

Here, the reference bandwidth is minimum frame size, which is extracted by the extractor 221 according to an embodiment of the invention.

Accordingly, the calculator 222 determines whether or not the number of channels (e.g., 4) extracted according to an embodiment of the invention exceeds a reference number of channels (e.g., 3), and expands the reference bandwidth (e.g., 80 kbps) according to the exceeding number (i.e., expands for example 24 kbps per channel).

As a result, the calculator 222 calculates a service bandwidth of 104 kbps (=80 kbps+24 kbps) when 4 channels are set in the request message, calculates a service bandwidth of 128 kbps (=80 kbps+24 kbps+24 kbps) when 5 channels are set in the request message, and calculates a reference bandwidth of 80 kbps when 1 through 3 channels are set.

While the calculator 222 is described as being configured to expand the reference bandwidth using the number of channels set in the request message according to an exemplary embodiment of the invention, this is not intended to limit the invention.

For example, the memory 210 may be configured to provide a calculation database including a service bandwidth corresponding to the number of channels, and the calculator 222 may be configured to read the service bandwidth corresponding to the number of channels of the mobile station 10-1 from the memory 210 based on corresponding calculation information.

The setter 223 sets the service bandwidth calculated by the calculator 222 as a service bandwidth of a corresponding CID.

A call processor 224 processes a call signal in a service bandwidth of a CID set by the calculator 222. The call processor 224 identifies the CID of the call signal and transmits the call signal in the service bandwidth of the CID. Here, it is apparent that the call processor 224 performs negotiation related with another call signal in the corresponding service bandwidth according to whether or not a corresponding call signal can be processed in the service bandwidth of the corresponding CID.

Figure 4:
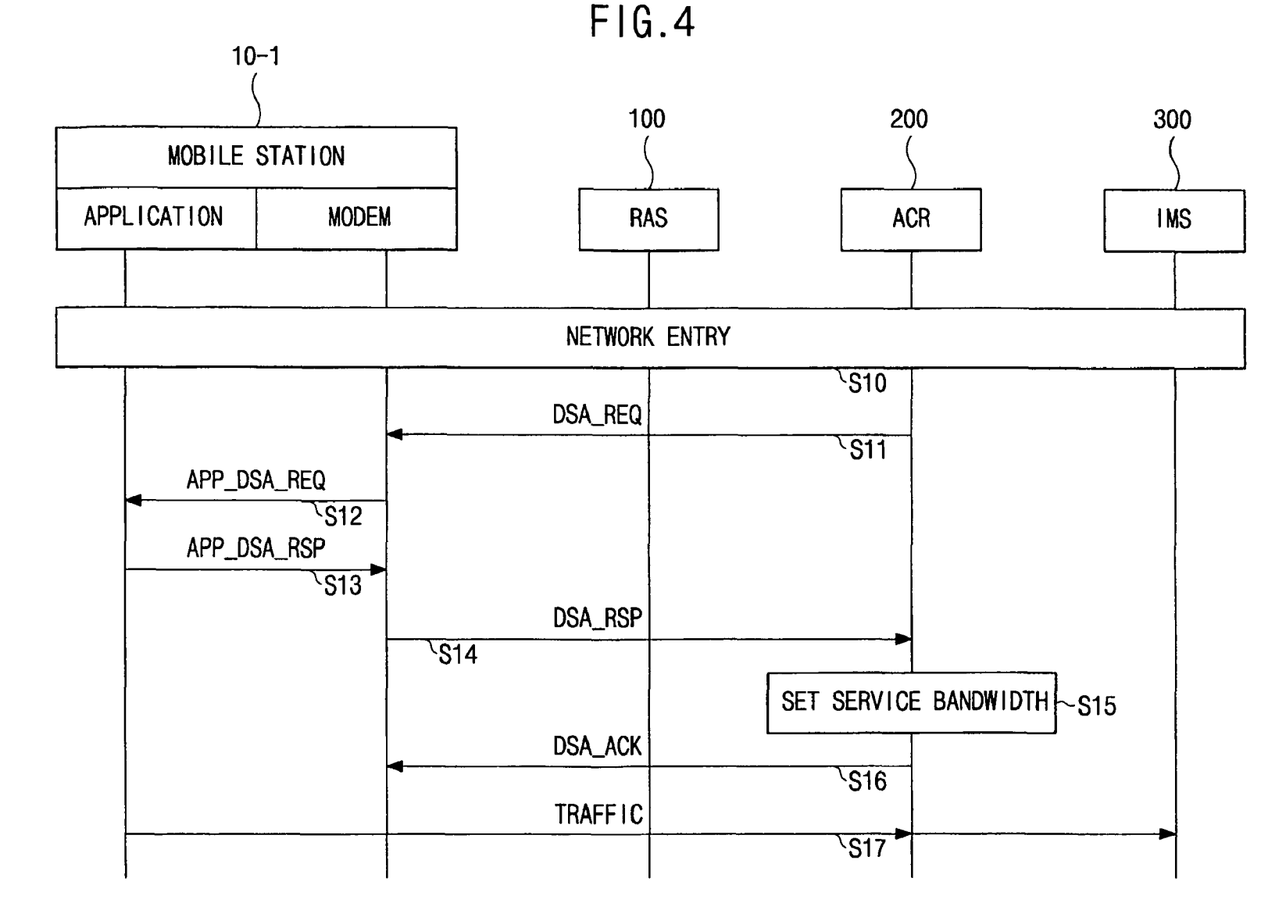
FIG. 4 is a traffic flow diagram illustrating a method of setting multi-channels in a network system according to an exemplary embodiment of the invention.

FIG. 4 is a traffic flow diagram illustrating a method of setting multi-channels in a network system according to an exemplary embodiment of the invention.

Referring to FIG. 4, the mobile station 10-1 performs network entry to enter the network system (S10). In this step, the mobile station 10-1 exchanges RNG-REQ/RSP, SBC-REQ/RSP, PKM-REQ/RSP and REG-REQ/RSP messages with a new RAS.

Then, the ACR 200 transmits a Dynamic Service Addition Request (DSA_REQ) message to the mobile station 10-1, which performed the network entry (S11).

As such, the network system according to this embodiment of the invention is realized in an MS-init mode in which the ACR 200 primarily transmits a DSA_REQ message to the mobile station 10-1. However, this is not limiting the present invention to the characteristics of DSA related messages. Rather, the network system can be realized in a BS-init mode in which the mobile station 10-1 primarily transmits a message to the ACR 200.

Next, the mobile station 10-1 determines whether or not it is set to a UGS in a previous network access process based on the received DSA_REQ message, and when set to the UGS, performs a known service management process. When not set to the UGS, the mobile station 10-1 transmits a request message according to an embodiment of the invention to the ACR 200 in order to set a channel, which the mobile station 10-1 attempts to use, as one CID.

For this, the modem of the mobile station 10-1 requests channel information (the number of channels, a channel identifier and a minimum frame size to be used by the mobile station 10-1) from an upper application (S12). Here, the modem sends an APP_DSA_REQ message to request the channel information. Then, the modem of the mobile station 10-1 receives an APP_DSA_RSP in response to the APP_DSA_REQ message (S13).

Then, the mobile station 10-1 transmits a response message (e.g., a DSA_RSP message) including the channel information (the number of channels, a channel identifier and a minimum frame size to be used by the mobile station 10-1 will use) to the ACR 200 (S14).

The ACR 200 calculates a bandwidth according to the number of channels of the mobile station 10-1 based on the received response message (e.g., a DSA_RSP message) and sets the calculated bandwidth as a service bandwidth of a corresponding CID (S15). Then, the ACR 200 transmits an acknowledgment message (e.g., a DSA_ACK message) to the mobile station 10-1 (S16).

Accordingly, the ACR 200 processes a call signal, which the mobile station 10-1 requests in a plurality of channels, using one CID (S17).

Figure 5:
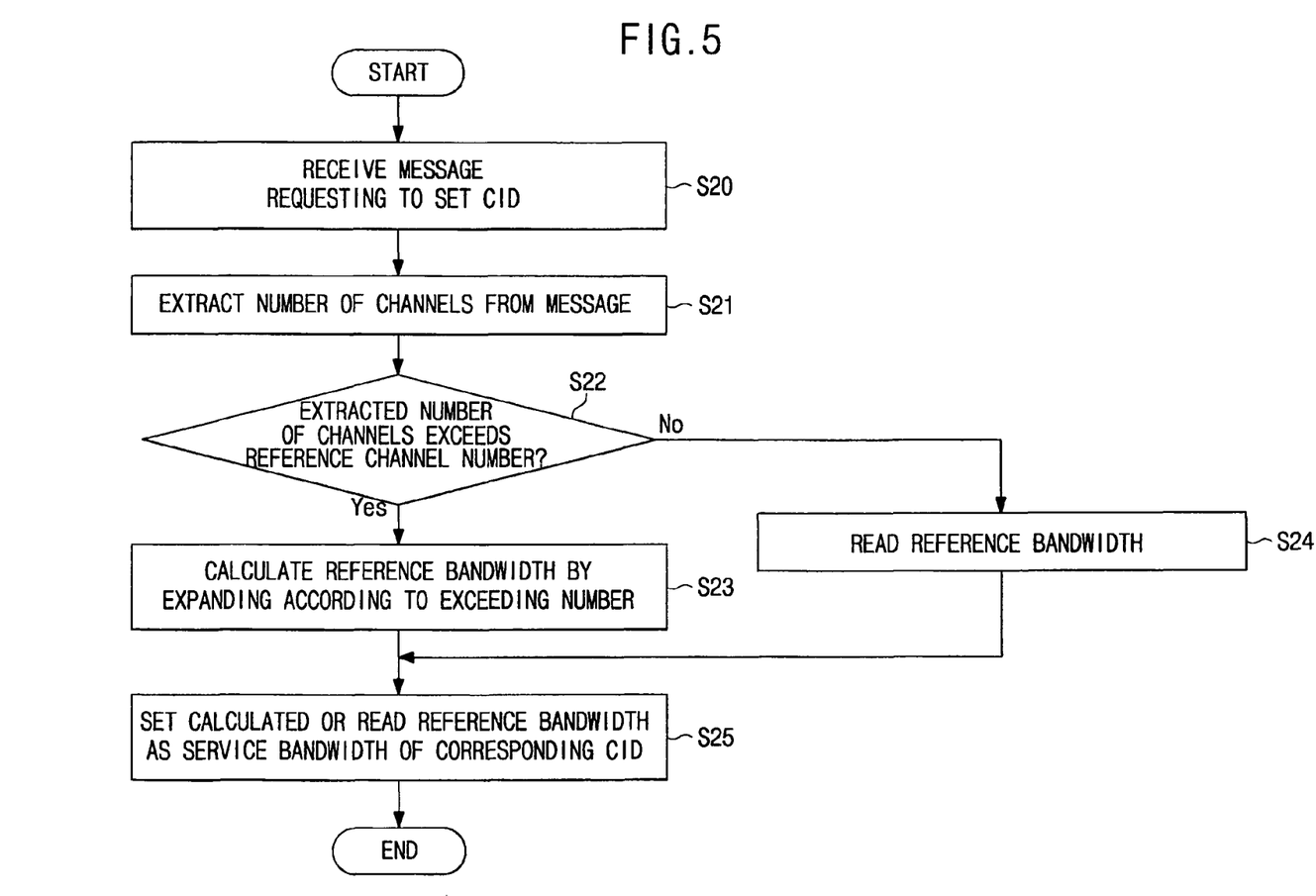
FIG. 5 is a flowchart illustrating a method of setting multi-channels by an ACR of a network system according an exemplary embodiment of the invention.

FIG. 5 is a flowchart illustrating a method of setting multi-channels by an ACR of a network system according an exemplary embodiment of the invention.

Referring to FIG. 5, the ACR 200 transmits a DSA_REQ message according to a network entry process to the mobile station 10-1 and receives a DSA_RSP message requesting to set a CID (S20).

Then, the extractor 221 extracts the number of channels of the mobile station 10-1 from the received DSA_REQ message (S21).

The calculator 222 then determines whether or not the extracted number of channels exceeds a reference number of channels of calculation information stored in the memory 210 (S22).

If it is determined that the extracted number exceeds the reference number of channels (e.g., 3) as the result of the step S22, the calculator 222 calculates a result according to the exceeding number (S23). Specifically, since the exceeding number is three (3), a reference bandwidth of the calculation information (80 kbps) is expanded (for example, by adding three times of 24 kbps) to thereby calculate a result (e.g., 152 kbps).

If it is determined that the extracted number does not exceed the reference number of channels (e.g., the exceeding number is 0) as the result of the step S22, the calculator 222 reads the reference bandwidth (80 kbps) as it is (S24).

Then, the setter 223 sets the bandwidth (152 kbps) calculated in the step S23 or the bandwidth 80 kbps read in the step S24 as a service bandwidth of a corresponding CID (S25).

Next, the ACR 200 carries out multi-channel call processing, requested by one CID, through a service bandwidth set to the corresponding CID. When the requested call processing is short of a service bandwidth due to call processing through another channel, scheduling can be performed through negotiation with another call.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus in a control station for setting multi-channels in a network system, the apparatus comprising:
   a controller configured to (i) receive, from a mobile station, a request message to set a connection identifier for a multi-channel communication service, the request message comprising channel information that includes the number of channels to be used by the mobile station, (ii) calculate a bandwidth for the connection identifier according to the number of channels indicated in the request message received from the mobile station, and (iii) set the calculated bandwidth as a service bandwidth of the connection identifier; and
   a memory configured to store calculation information, based on which the bandwidth is calculated according to the number of channels,
   wherein the controller comprises:
      an extractor configured to extract the number of channels to be used by the mobile station from the request message received from the mobile station,
      a calculator configured to calculate the bandwidth of the number of channels extracted by the extractor based on the calculation information in the memory, and
      a setter configured to set, when the request message to set a connection identifier is received, the bandwidth calculated by the calculator based on the calculation information in the memory as the service bandwidth of the connection identifier.

2. The apparatus according to claim 1, wherein the channel information further includes at least one of an identification information of the channels and a minimum frame size of the mobile station.

3. The apparatus according to claim 1, wherein the calculation information includes at least one predetermined number of channels and a service bandwidth according to the predetermined number of channels.

4. The apparatus according to claim 1, wherein the calculation information includes a reference number of channels and a reference bandwidth.

5. The apparatus according to claim 4, wherein the reference bandwidth comprises the minimum frame size included in the channel information.

6. The apparatus according to claim 4, wherein the calculator is further configured to calculate the bandwidth by expanding the reference bandwidth according to a degree by which the extracted number of channels exceeds the reference number of channels.

7. A method of setting multi-channels in a network system, comprising:
   receiving, from a mobile station, a request message to set a connection identifier for a multi-channel communication service, the request message comprising channel information that includes the number of channels to be used by the mobile station;
   storing, in a memory of the control station, calculation information based on which a bandwidth is calculated according to the number of channels to be used by the mobile station;
   calculating, at a control station, the bandwidth for the connection identifier according to the number of channels included in the request message received from the mobile station, wherein calculating the bandwidth comprises:
      extracting the number of channels to be used by the mobile station from the request message received, and
      calculating the bandwidth according to the extracted number of channels based on the stored calculation information; and
   setting the calculated bandwidth as a service bandwidth of the connection identifier.

8. The method according to claim 7, wherein the channel information further includes at least one of an identification information of the channels and a minimum frame size of the mobile station.

9. The method according to claim 7, wherein calculating the bandwidth according to the extracted number of channels comprises:
   calculating the bandwidth by reading the service bandwidth corresponding to the extracted number of channels using the calculation information, which includes at least one predetermined number of channels and a service bandwidth according to the predetermined number of channels.

10. The method according to claim 7, wherein calculating the bandwidth according to the extracted number of channels comprises:
    calculating the bandwidth using the calculation information, which includes a reference number of channels and a reference bandwidth, by expanding the predetermined number of channels according to a degree, by which the number of channels exceeds the reference number of channels.

11. The method according to claim 10, wherein the reference bandwidth comprises the minimum frame size included in the channel information.

12. A method of setting multi-channels in a network system, comprising:
    transmitting, by a mobile station, a request message to set a connection identifier for a multi-channel communication service, the request message comprising channel information that includes the number of channels to be used by the mobile station, wherein the request message is used to calculate a bandwidth for the connection identifier according to the number of channels; and
    determining whether the mobile station has already been set to an Unsolicited Grant Service (UGS) in a previous network access process, wherein the request message is transmitted when the mobile station has not been set to a UGS in a previous network access process.

13. The method according to claim 12, wherein the channel information further includes at least one of an identification information of the channels and a minimum frame size of the mobile station.

14. The method according to claim 13, wherein transmitting the request message comprises:
  requesting, by a modem of the mobile station, the channel information from an upper application of the mobile station; and
  receiving the channel information from the upper application.

15. The method according to claim 12 further comprising:
  receiving an acknowledgment message indicating that the calculated bandwidth has been set for the requested connection identifier.

16. The method according to claim 12, further comprising:
  performing a network entry into a network system; and
  receiving a dynamic service addition request (DSA_REQ) message after performing the network entry,
  wherein whether the mobile station has already been set to a UGS in a previous network access process is determined based on the DSA_REQ.

* * * * *